(12) United States Patent
Gódor et al.

(10) Patent No.: US 11,318,377 B2
(45) Date of Patent: May 3, 2022

(54) TECHNIQUE FOR ONLINE VIDEO-GAMING WITH SPORTS EQUIPMENT

(71) Applicant: Telefonaktiebolaget LM Ericsson (publ), Stockholm (SE)

(72) Inventors: István Gódor, Budapest (HU); Gabor Feher, Székesfehérvár (HU); Andras Balazs Lajtha, Budapest (HU); László Toka, Budapest (HU); Attila Vidacs, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 441 days.

(21) Appl. No.: 16/320,314

(22) PCT Filed: Jul. 13, 2017

(86) PCT No.: PCT/EP2017/067739
§ 371 (c)(1),
(2) Date: Jan. 24, 2019

(87) PCT Pub. No.: WO2018/028923
PCT Pub. Date: Feb. 15, 2018

(65) Prior Publication Data
US 2019/0388783 A1 Dec. 26, 2019

Related U.S. Application Data

(60) Provisional application No. 62/372,272, filed on Aug. 8, 2016.

(51) Int. Cl.
A63F 13/28 (2014.01)
A63F 13/21 (2014.01)
(Continued)

(52) U.S. Cl.
CPC .............. *A63F 13/28* (2014.09); *A63F 13/21* (2014.09); *G06F 3/011* (2013.01); *G06F 3/016* (2013.01);
(Continued)

(58) Field of Classification Search
CPC .......... A63F 13/28; A63F 13/21; G06F 3/011; G06F 3/016; H04L 67/12; H04L 67/22
See application file for complete search history.

(56) References Cited

U.S. PATENT DOCUMENTS 7,789,742 B1 9/2010 Murdock et al.
8,834,303 B2 9/2014 Jennings
(Continued)

FOREIGN PATENT DOCUMENTS

WO 2007006083 A1 1/2007

OTHER PUBLICATIONS

Takashi, D., et al., "Zepp brings the internet of Things to tennis rackets and other sports gear", Jan. 9, 2015, pp. 1-8, retrieved from internet: https://venturebeat.com/2015/01/09/zepp-brings-the-internet-of-things-to-tennis-rackets-and-other-sports-gear/; retrieved on Sep. 26, 2017.
(Continued)

Primary Examiner — William H McCulloch, Jr.
Assistant Examiner — Ankit B Doshi
(74) Attorney, Agent, or Firm — Coats & Bennett, PLLC

(57) ABSTRACT

Methods and apparatus for use in an Internet-of-Things (IoT) system are presented. A method performed by a network node in an Internet-of-Things (IoT) system is presenting in an example embodiment. According to this example method, a network node or a plurality of network nodes working collaboratively can obtain data captured by one or more IoT devices and associated with an interactive activity with which different participants interface at differ-
(Continued)

ent sites. Furthermore, the network node(s) may determine a state of the activity by applying the data to a data model. Moreover, the network node(s) can, in an example method, provide one or more feedback signals to feedback devices associated with one or more of the different sites to actualize the determined state of the activity, where at least two of the different sites have disparate, meaning non-identical, feedback device sets.

12 Claims, 8 Drawing Sheets

(51) Int. Cl.
    *G06F 3/01*     (2006.01)
    *H04L 29/08*     (2006.01)
    *A63F 13/213*     (2014.01)
    *A63F 13/215*     (2014.01)
    *A63F 13/285*     (2014.01)
    *H04L 67/12*     (2022.01)
    *H04L 67/50*     (2022.01)
(52) U.S. Cl.
    CPC .............. *H04L 67/12* (2013.01); *H04L 67/22* (2013.01); *A63F 13/213* (2014.09); *A63F 13/215* (2014.09); *A63F 13/285* (2014.09); *A63F 2300/1081* (2013.01); *A63F 2300/1087* (2013.01); *A63F 2300/302* (2013.01)

(56) References Cited

U.S. PATENT DOCUMENTS

| | | |
|---|---|---|
| 2006/0148594 A1 | 7/2006 | Saintoyant et al. |
| 2008/0242409 A1 | 10/2008 | Schueller |
| 2009/0023522 A1 | 1/2009 | McNamara, III |
| 2009/0029754 A1 | 1/2009 | Slocum et al. |
| 2015/0126826 A1* | 5/2015 | Kaleal, III ......... A61B 5/02055 600/301 |
| 2018/0369699 A1* | 12/2018 | Ghanchi ................ A63F 13/25 |

OTHER PUBLICATIONS

Praboo, S., "Intelligent Traffic Management—Applying Analytics on Internet of Things", May 25, 2016, pp. 1-4, retrieved on Sep. 28, 2017, obtained from internet: https://www.linkedin.com/pulse/intelligent-traffic-management-applying-analytics-internet-praboo/.

Mueller, F. "Building a Table Tennis Game for Three Players", Proceedings of the International Conference on Advances in Computer Entertainment Technology, NY, US Jun. 13, 2007, pp. 179-182.

Delannay D. et al., "Detection and Recognition of Sports(wo)men from Multiple Views", Third ACM/IEEE International Conference on Distributed Smart Cameras, Aug. 30, 2009, pp. 1-7, IEEE.

* cited by examiner

TECHNIQUE FOR ONLINE VIDEO-GAMING WITH SPORTS EQUIPMENT

TECHNICAL FIELD

The application relates to systems, methods, and apparatus for participating in online gameplay with other participants in different locations.

BACKGROUND

Internet-of-Things (IoT) is the vision of virtually all objects being connected to the internet, where the objects can be anything from simple sensors to large, sophisticated machinery. For instance, in the physical fitness and sports space, wearable IoT devices have been designed to track athletes' training regimens and to optimize the fitness plans of even the amateur athlete. Contrary to traditional physical activities, such as organized team sports and cross training, existing IoT devices tailored for use in video games can only be played at home in front of a television with expensive video game console devices. As a result, these devices rarely incite players to engage in meaningful physical activity in order to lead a healthy life.

Prior art can be found in, e.g.: US 2006/0148594 A1, which generally relates to a smart communicating sports equipment; US 2009/0029754 A1, which generally relates to tracking and interactive simulation of real sports equipment; WO 2007/006083 A1, which generally relates to a game of chance for playing in conjunction with a sporting contest such as Rugby Union and Rugby League, in which a ball is used and in which scoring areas in the sporting contest are divided into a number of scoring zones with the results of the game of chance being determined by the position or positions of the ball or a movement or movements of the ball into the scoring zones; U.S. Pat. No. 8,834,303 B2, which generally relates to an arena baseball game system and method for playing an electronic interactive spectator participation game; U.S. Pat. No. 7,789,742 B1, which generally relates to a system that wirelessly integrates actual golf equipment with the computer and the internet to allow players remotely located from one another to play a competitive simulated game of golf; US 2009/0023522 A1, which generally relates to a method of managing the real-time play performance and play flow between geographically remote players of a golf type game comprising real golf shots where a hit ball traverses and encounters a real physical surface; and US 2008/0242409 A1, which generally relates to video feed synchronization in an interactive environment.

Data from the smart sports equipment and, for example, squash courts are generally processed locally, whereby high-level information, for example a score of a game, is shared across sites and players.

In addition, IoT devices have been implemented as smart sports equipment and in smart sport spaces (e.g., gyms, courts, etc.), but up to now this technology has been utilized exclusively for physically playing traditional sports. For at least these reasons, improved techniques are needed for utilizing IoT devices and systems to improve the physical health of individuals and maximize the utility of available smart athletic devices and spaces.

SUMMARY

A network node in an IoT system and a method executed by a network node in an IoT system according to the present disclosure are outlined in the independent claims. Variants of the network node and the method executed by the network node are set out in the dependent claims. We further describe a computer program comprising instructions which, when executed by at least one processor of a network node, case the network node to carry out the method according to variants as described herein. Further still, we describe a carrier containing such a computer program.

One or more embodiments herein allow for improved utilization of IoT devices and systems in competitive or cooperative sports, games, or other activities whereby one or more participants may interface with the activity via an electronic device (e.g., a video game console and/or television), which other participants may interface in a traditional physical manner that involves a lesser degree of virtual interaction with an activity space.

Some embodiments, for example, include a method executed by a network node (or a plurality of network nodes working in concert) in an Internet-of-Things (IoT) system that includes obtaining data captured by one or more IoT devices and associated with an interactive activity with which different participants interface at different sites. In addition, the network node (or nodes) may determine a state of the activity by applying the obtained data to a data model. Furthermore, the network node(s) may provide one or more feedback signals to feedback devices associated with one or more of the different sites to actualize the determined state of the activity. What is more, in some examples, at least two of the different sites may have disparate (i.e., non-identical) feedback device sets.

Further embodiments include corresponding apparatus, computer programs, and computer program products.

BRIEF DESCRIPTION OF THE DRAWINGS

These and other aspects of the present disclosure will now be further described, by way of example only, with reference to the accompanying figures, and in which.

DETAILED DESCRIPTION

Figure 1:
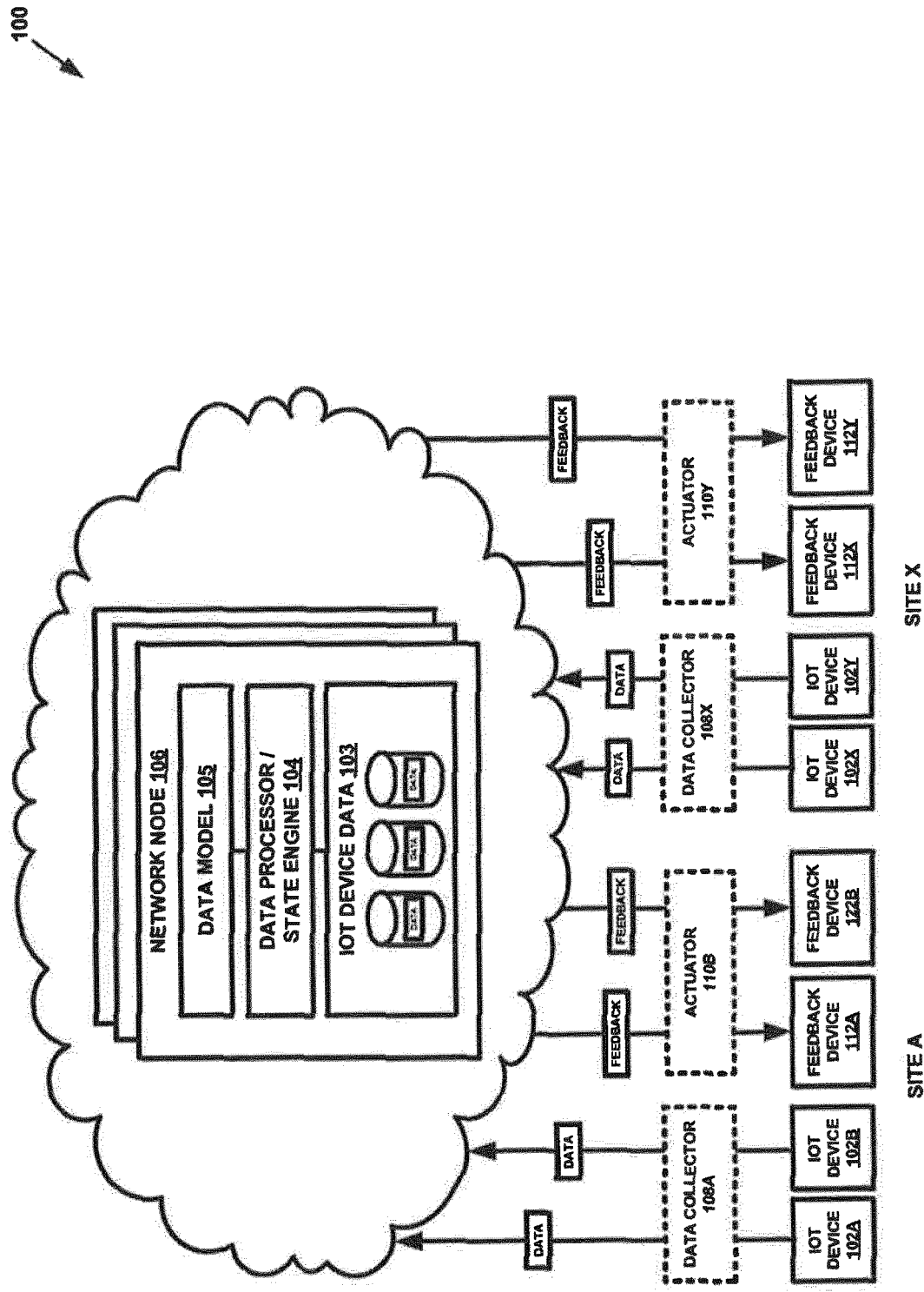
FIG. 1 illustrates an IoT system corresponding to example embodiments of the present invention.

The present disclosure describes example techniques for utilizing network nodes in a cloud-based, IoT-capable network to construct, maintain, and render a state of a multi- or solo-participant activity to one or more participant-specific activity environments/feedback device sets. This allows participants in disparate locations and with potentially mutually-exclusive sets of available feedback devices to contemporaneously participate in the activity, whether competitively or cooperatively, by interfacing/interacting with the rendered activity state via data input to the network node(s) and feedback implementing the rendered state from the network node(s) to one or more feedback devices in the participant feedback device set. This input data can include one or both of observed data generated by IoT devices without significant participant interaction (e.g., environment sensors, microphones, cameras) or via direct input to the activity state via physical movement or electronic signals (e.g., a video game controller or "smart" sports/activity apparatus). In some examples, the feedback provided to the participant by the network node(s) may be participant-specific and can depend upon the participant's particular environment/feedback device set and the generated activity state calculated by the network node(s).

This flexible, device-set- and participant-specific activity state rendering functionality, does not limit participants to those with a preferred activity style or prescribed/concrete set of available IoT and/or feedback devices. Instead, some participants may physically perform the activity (e.g., run and swing at a ball with a racquet), whereas another participant may use a computer and input/output (I/O) device (e.g. a virtual racquet, video game controller, laptop, tablet, etc.) to participate in the activity virtually (e.g., by interacting with the activity, the activity space, and other participants through an electronic device). In some examples, the participants may interface with the interactive activity in a feedback-device-rendered variation of a traditional real-life form of the activity.

In some aspects of the present disclosure, the activity may comprise a competition between or among a plurality of the different participants or a competition between a single participant against a benchmark or previous score.

In an aspect of the present disclosure, these and other features may be realized by an activity-controlling network node or network nodes that, in some examples, form a cloud computing environment. The network node(s) can receive observed data from different IoT devices configured to capture certain aspects of the activity (e.g., images or video via one or more IoT cameras, temperature via thermometers, sounds via microphones, or any other type of sensor that can provide the network node(s) useful data regarding a present and/or future state of the activity).

Based on this data provided by the IoT devices located at one or more activity sites (e.g., real-world, virtually rendered, or mixed activity spaces), one or more data processing modules in the network node(s) can process the data according to a static (i.e., predefined) or dynamic (i.e., "smart" or specific to IoT device-provided data, malleable and environment/state dependent) data model. Based on the application of the IoT-device-provided data to the data model, the network node(s) can construct a current state of the activity. This state may include one or more conditions, parameter values, participant or object (e.g., ball, Frisbee, racquet) locations or movement characteristics, site-specific conditions, network profile, available device and/or network resources, time of day, history, etc. that defines a current (or recently observed) state of the activity or game.

Based on this current state (and/or past states), the network node(s) can provide feedback to some or all of the participants to render a real-time (or quasi-real-time) dynamic activity experience for the individual participants via their unique set of feedback devices. This feedback, for instance, may include rendering an interactive virtual activity space to an online video game user (e.g., displaying a virtual activity space on a television and providing vibratory tactile feedback via a video game controller) and/or a real-world rendering (e.g., via image projection on one or more walls, sounds, tactile feedback) via activity-, state-, and/or participant-specific feedback instruments (e.g., vibrating squash racquet, lights on a dark basketball court, speakers), thereby providing a representation of the network-maintained activity state to participants more physically participating in the activity. By maintaining the same present activity state (and optionally predicting one or more future states), the network node(s) of an IoT network environment allow for interactive, real-time activity participation for participants who are located anywhere that has access to the network and whose method of interacting with the activity and other participants can vary significantly from almost purely physical (i.e., traditional or "real-world") to almost purely virtual (e.g., via a virtual reality headset, video game controller, and other activity-specific sensory immersion tools).

A myriad of activities can be optionally presented for participant interaction by the present embodiments, from single-player chess to virtual multi-participant golf matches, and from traditional squash (with projected statistics about score, performance, etc.) and any other single-, and/or multiplayer video games that are traditionally played through home video game consoles or computers via a TV screen communicating with one or more network nodes over wired and/or wireless content provider networks (e.g., 4G wireless networks, the Internet). For example, one player alone in a squash court in Budapest could hit the squash ball to the front-wall, while another player alone in a squash court in Stockholm could hit a squash ball to the front-wall, and according to the locations the two balls hit the wall, a projected "brick breaker game" (computed in a network node in a California data center, and projected in the two courts the same way in effectively real time) could be destructed simultaneously. The proposed systems allow for multi-purpose usage of widely available and relatively inexpensive IoT-based sensors and/or feedback devices located near a participant (e.g., mounted on a squash court and on smart sports equipment). The I/O interfaces can be implemented by the aforementioned equipment, which is often already necessary and in place in a particular activity location, in order to enrich a traditional sporting (activity) experience. The computations related to the actual activities, sports, competitions, games can be performed in the cloud, as opposed to local (e.g., activity space specific) computation performed in game consoles or computers, and the network connectivity of the activity spaces, already in place, can be used to transfer the sensor data to the network nodes comprising the cloud network, which uses the data to monitor a state of the activity and render the state to each participant via a particular user interface and device-set-specific feedback to the activity spaces.

FIG. 1 illustrates an example IoT communication system 100 ("IoT system," "system") that includes IoT devices 102 in communication with one or more network nodes 106, which together may operate as a cloud computing network. In such a cloud computing network configuration, the network nodes 102 may operate collaboratively, as each network node may utilize its own processing resources, memory, modules, etc. in conjunction with those of other network nodes to perform aspects of the present disclosure. This is illustrated in FIG. 1 by the stacked network nodes 106, indicating that although a single network node 106 may include each of the components and perform all of the aspects of the present embodiments attributed to a network node 106, in some examples a plurality of network nodes 106 may work in conjunction to do so. Therefore, in some embodiments, a separate network node 106 may perform one aspect of an embodiment and may contain an associated module for doing so, and different network node 106 may perform a separate aspect of the embodiment and may contain the associated module for performing that second aspect. As such, the term "network node" can be substituted for the term "network nodes" as used herein.

IoT devices 102 are configured to generate data 103 and transmit that data 103 to the network node 106. The data 103 may include any type of data, including data that the particular IoT device 102 is configured to generate, transmit, and/or otherwise output. For instance, the IoT device 102 may be a sensor, such as, but not limited to, a temperature sensor/thermostat, a camera, microphone, or any other device configured to communicate autonomously with one or more other wireless devices or network nodes. In some examples, the IoT devices 102 may be configured to generate data associated with a particular activity, such as, but not limited to a sport, video game, athletic contest, or any other observable activity in which one or more participants can take part in the real world or virtually. In the present disclosure, an example embodiment will be presented wherein one or more participants compete in a game of squash (racquet sport) that is observed by one or more IoT devices 102 and rendered by network nodes 106. This serves as an example use-case that illustrates the ways in which different participants can participate in a fast-paced collaborative or competitive activity via sophisticated functional operation and state rendering on the network side. Though this is one example use-case, it is not meant to be regarded in any way as limiting.

As shown in FIG. 1, the system 100 can provide a hub for activity participation at disparate locations, or "sites," such as site A and site X. Each site may include one or more IoT devices 102, as well as one or more feedback devices 112. These devices 102, 112 may include sets of identical, completely different, or partially-overlapping sets of IoT and feedback device types. As shown, for example, site A includes IoT devices 102A and 102B, whereas site X includes IoT devices 102X and 102Y. Likewise, the two sites contain feedback devices 112A and 112B, and 112x and 112Y, respectively. In some examples, an optional (indicated by the dashed outline) data collector device or module 108A/108X may collect data 103 observed by IoT devices 102 at site A/X, and may cache and/or forward the data 103 to the network node(s) 106 for subsequent processing and activity state monitoring. Likewise, feedback signals that actualize the computed activity state via feedback devices 112 may be routed through an actuator device or module 110B/110Y in site A and/or site X respectively. This actuator may decode, parse, and/or perform other processing of the feedback signals such that the activity state is properly rendered to the participant when forwarded to the one or more feedback devices 112 in the feedback device set associated with a given site.

Turning to the network side operation, once the network node 106 has received the data 103, the network node 106 may store the observed IoT device data 103 in a local memory (or in memory of another accessible device). Based on the data received from the IoT devices 102, data processor and state engine implemented on network node 106 may process a state of the activity indicated by the data 103 and/or may predict events that may occur at a future time. For instance, in the squash example, an IoT camera, accelerometer, or smart squash racquet device 102 may initially send data to the network node 106 that indicates a ball or racquet is moving at a certain speed and direction, and from that data, the data processor/state engine 104 can predict that the ball is being struck (or will be struck) or is hitting a wall (or will hit a wall) in the squash court (the wall contact being the present or predicted event) at the sensor-observed time or particular estimated time in the future.

These events, along with observed parameter values indicating environmental and time-specific activity conditions, can make up a current "state" of the activity. Such states may be defined by applying the observed data 103 to a preconfigured, later-obtained, static, or dynamic definitional instruction set, which is referred to herein as data model 105. To calculate an activity state, the data processor/state engine may query the data model 105 for information regarding how a state is to be defined and generated in view of any obtained set of IoT device data 103. Once the state has been defined, the data processor/state engine 104 can further generate, based on the generated activity state and the composition of site-specific feedback device sets (e.g., 112X and 112Y for site X), a corresponding set of feedback signals that, when received by the feedback devices 112, actualize the state of the activity for each participant via his or her available feedback devices 112. For instance, this may include delivering commands to a speaker to emit a sound, a projector above a squash court to render an image or hologram of a ball or other participant(s) in a particular location on the rendered court map, a handheld video game console to vibrate and display a state-specific 2-dimensional display screen rendering, or any other sensory feedback to the users. Furthermore, not only are each of these feedback signals generated and rendered on a participant/device-specific granularity, but each of the unique feedback signal sets destined for each particular site can indicate a same (or substantially the same) rendering of a state, with any differences in the actualized activity state being defined by the device-imposed limitations of the feedback device set of each unique activity site.

This IoT device capture to state generation to tailored state actualization process may be repeated at a particular frequency such that the state is rendered, at least from the participants' perspective, continuously and in substantially real time. However, this may not always be the case, as limitations imposed by available network and device processing power and time-frequency resources may limit the performance capability of the system. In such instances, the network node(s) 106 (or any other controlling device, which may optionally include any device or node included or not shown in FIG. 1) may throttle the amount of data 103 reported to the network nodes 106, the frequency of such reporting or capture (from a blanket rule to a device-specific policy change or even to an internal device setting alteration for a single device), or the degree of processing power or medium/channel resources throttling utilized on the network and/or device side. Such alterations may be implemented, for example, in an attempt to meet a Quality-of-Experience (QoE)/Quality of Service (QoS), throughput, or any other performance-defining metric/criterion of the system as applied to the ongoing participant activity.

As shown in FIG. 1, after determining any adapted IoT device settings based on the target optimization function, the network node 106 can deliver any adapted settings (or all settings, regardless of changes, in some examples) to appropriate IoT devices 102. In addition, network-size parameters, such as bandwidth allocation, data flow QoS, allocated processing power, and the like can be implemented according to any resulting adaptation. Thus, based on the actual and forecasted performance requirements and resource constraints of the system, the network nodes 106 or any other controlling device continuously optimizes the resource allocation by allocating an appropriate quantity and volume of underlying network resources (e.g., time and frequency resources, processing power, central processing units (CPUs)/graphics processing units (GPUs)/cores, memory, disk, etc.) and by controlling the granularity of sensor data 103 to be collected and uploaded by the IoT devices 102 for subsequent state generation, rendering, and/or prediction.

As such, in sum, the example implementation of FIG. 1 illustrates example devices and functional blocks of a proposed IoT system 100. In the lowest layer, at the edge of the IoT system, there are IoT devices 102, such as sensors (cameras, accelerometers, etc.). On the network side, network nodes 106 include memory and associated modules that receive and store data observed by one or more IoT devices 102 (optionally via separate data collector modules 108), which may take the form of raw, unprocessed sensor-collected data. Within the cloud-resident node modules 106, there are data processor blocks that are responsible for processing the uploaded data in order to distill information, in some cases events from the data 103 streams. The data model 105 defines the state of each activity/game session, which is oftentimes continuously refined be the data processor module(s) 104. When necessary, the data model 150 and/or data processor 104 generate and send feedback to the IoT system. This feedback may travel through the optional actuators 110 at the sites for processing and/or routing operations before being forwarded to the sites such that the participants are able to consume sensory information via feedback devices 112 (e.g., via a projection on a squash wall, audio played by speakers on the courts, and/or haptic feedback via vibration or other force feedback on racquets, etc.)

Figure 2:
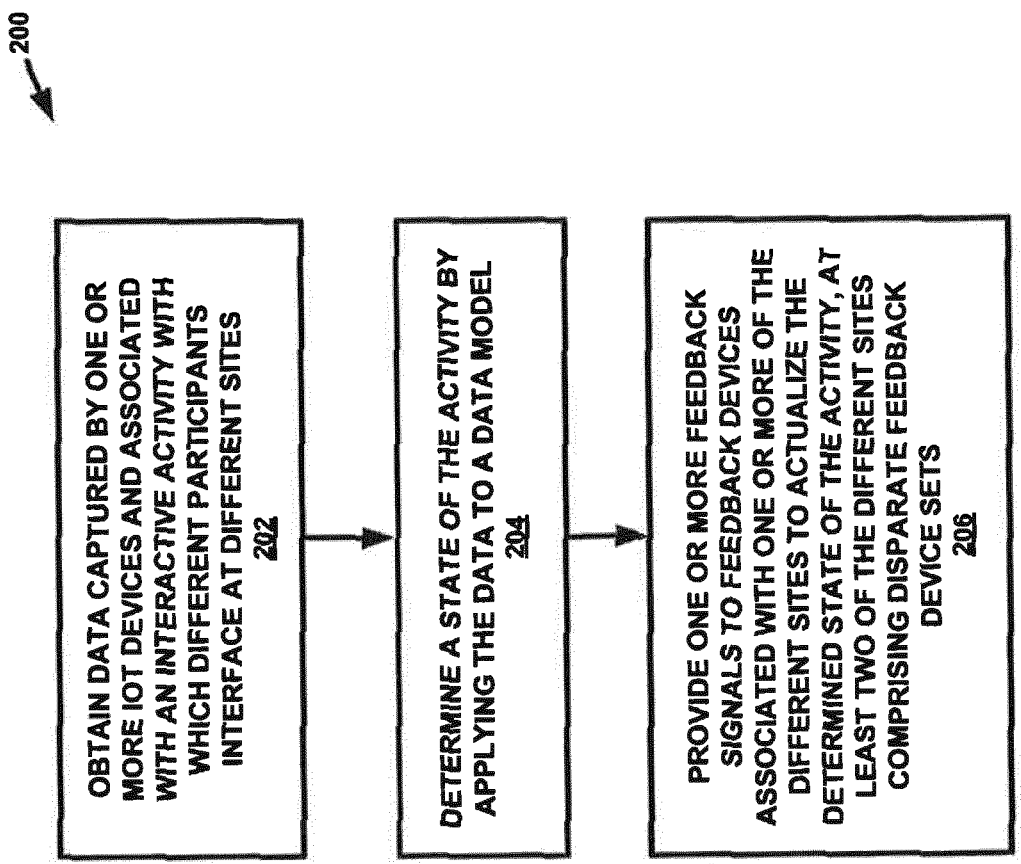
FIG. 2 illustrates a method performed by a network node (or collective network nodes) according to one or more embodiments.

FIG. 2 illustrates an example method 200 performed by one or more network nodes 106 for providing and maintaining an activity state that is actualized for one or more activity participants. For instance, at block 202, the network node 106 (e.g., via data collector module or device) can obtain data captured/observed by one or more IoT devices and associated with an interactive activity with which different participants interface at different sites.

In addition, at block 204, the network node 106 (e.g., via the data processing/state engine module of FIG. 1) can determine a state of the activity by applying the data to a data model.

In some instances, this may involve generating an effectively present or current state of the activity, whereas it may additionally or alternatively involve generating a future state of the activity, and/or predicting future events, with respect to individual participants.

Furthermore, method 200 may include, at block 206, providing one or more feedback signals to feedback devices associated with one or more of the different sites to actualize the determined state of the activity, at least two of the different sites having disparate feedback device sets. By disparate, this means that, at minimum, at least two device sets composed of the feedback devices available at two particular sites associated with two particular participants are non-identical.

Figure 3:
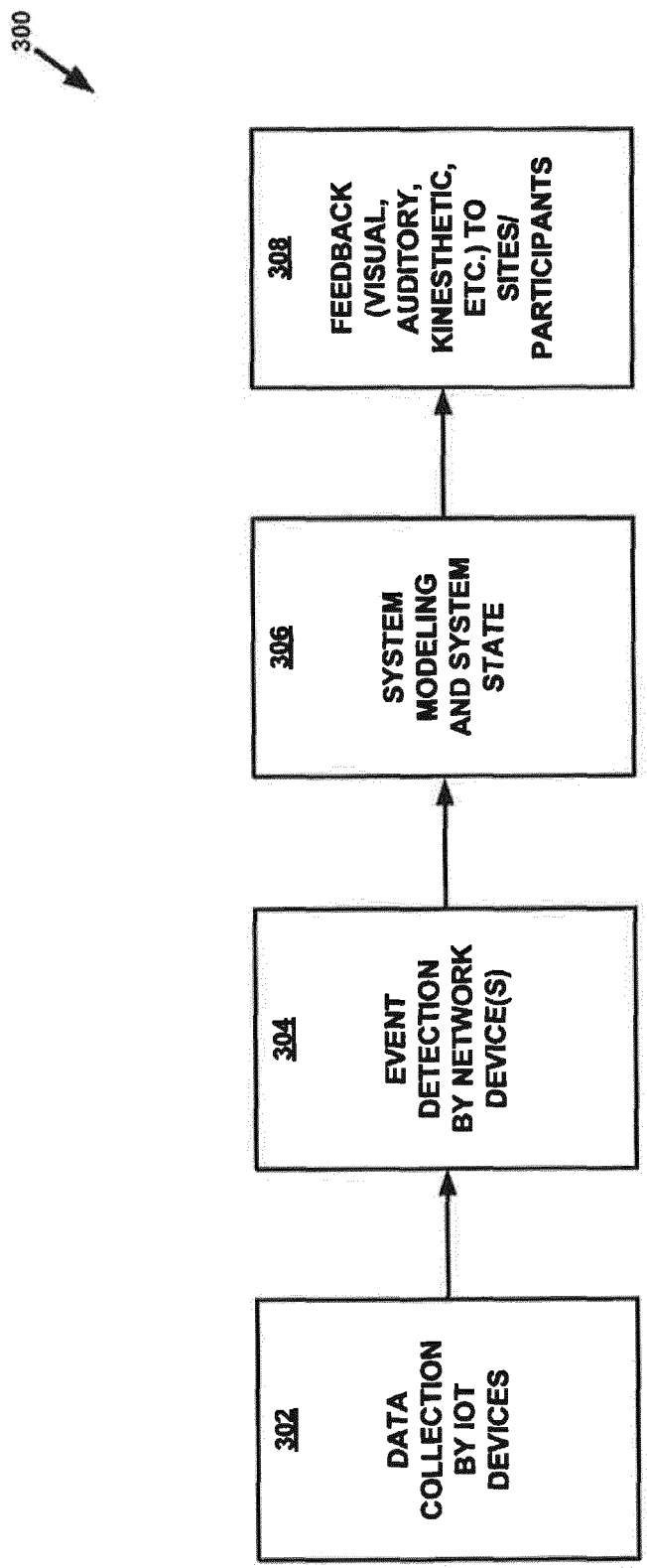
FIG. 3 illustrates further aspects of a method performed by a network node (or collective network nodes) according to one or more embodiments.

Turning to FIG. 3, aspects discussed above in reference to FIGS. 1 and 2 will be described in terms of the flow chart of method 300, which is related to the features of method 200. Returning to the squash example, for each game the network node 106 executes processes for maintaining a state of an activity. Again, such an activity state can include data, parameter values, static features, dynamic movements or changes relative to prior or predicted states or events, results of history-informed probabilistic event or characteristic forecasting, or any other feature that defines an aspect of the activity at a particular time. This can include a temperature, real or virtually rendered/mapped object or participant position or movement (position delta), a wall ball impact location, a stroke, jump, injury, noise, air pressure, moisture level, score, participant number or characteristic, etc., and more generally, can be any feature whatsoever when the present aspects are implemented outside of the squash context Turning to method 300, FIG. 3 shows a process chain from data gathering step at block 302 to the feedback step at block 308 that determines video and other feedback information that should be fed back to the participants at a given time to actuate a determined activity state. In the data collection step of block 302, data is collected from the site-specific environments by IoT devices 102 (any type of sensor, e.g., cameras). Next, at block 304, data is uploaded and processed in the cloud by the network node(s) 106, for instance, by decoding, parsing, and processing the data (including, in some instances, executing custom-made event detection algorithms, e.g., object/participant tracking). In the third step of block 306, the computed parameters and data associated with detected events or conditions are loaded into the data model, and the current model state of the observed system is established. In the fourth illustrated step of block 308, based on the current state defined by the data model and generated by data processing modules, feedback is provided to feedback devices included in particular feedback device sets associated with each participant (e.g., an image projected on a squash court wall is updated from a previously actualized state).

Figure 4:
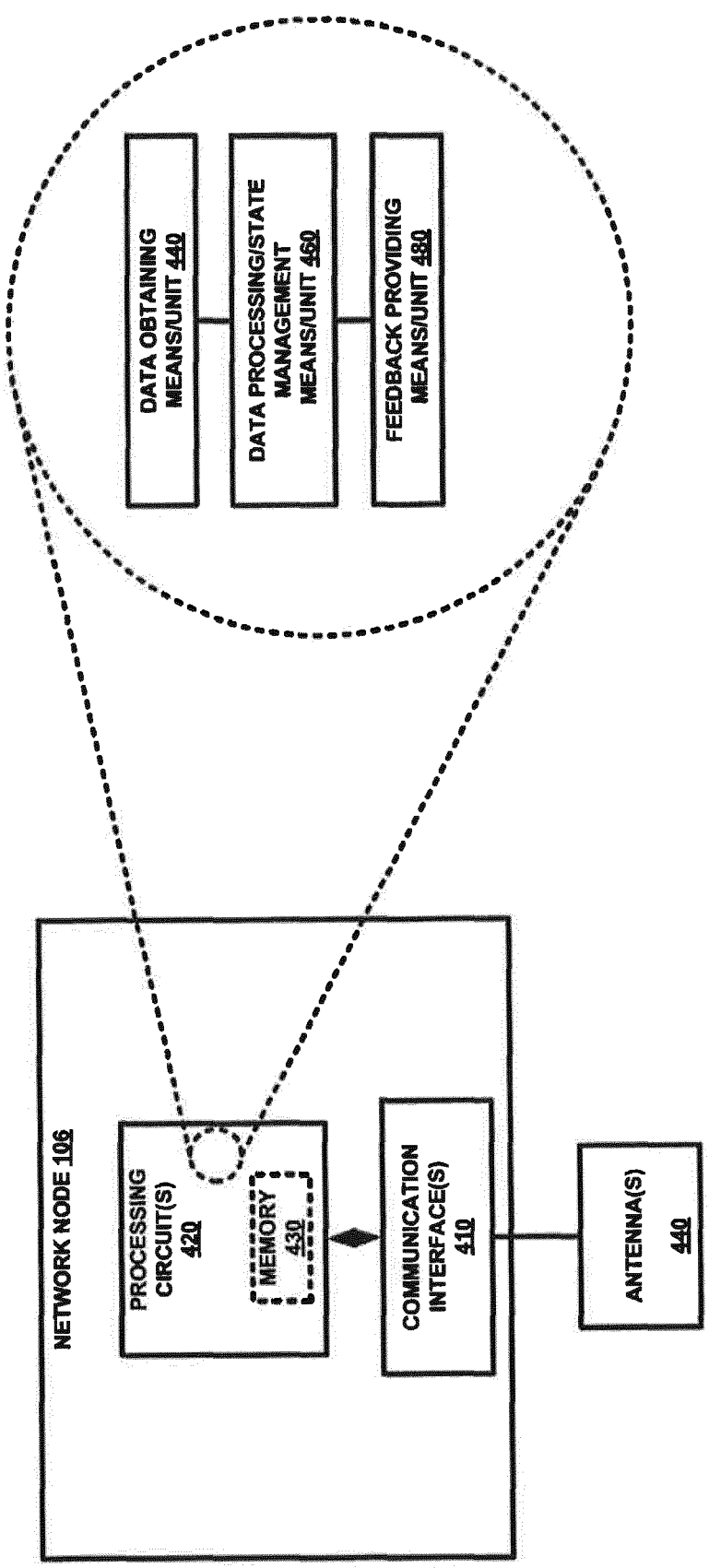
FIG. 4 illustrates aspects of an example network node in example embodiments of the present invention.

FIG. 4 illustrates additional details of an example network node 106 of an IoT system according to one or more embodiments. The network node 106 is configured, e.g., via functional means or units (also may be referred to as modules or components herein), to implement processing to perform certain aspects described above in reference to at least FIGS. 1-3. The network node 106 in some embodiments for example includes a data obtaining means or unit 440 for obtaining IoT-device-reported data, a data processing and state management means or unit 460 (which may correspond to data processor/state engine 104 of FIG. 1) for processing the obtained data to generate a state associated with an activity, and a feedback providing means or unit for sending site- and feedback-device-set-specific feedback instructions/commands to one or more activity sites (may correspond to data model 105 and/or data processor/state engine 104 of FIG. 1). These and potentially other functional means or units (not shown) together perform the aspects of methods 200 and 300 presented in FIG. 3 and/or further or alternative features described in FIGS. 1-3 as being related to the network node 106.

In at least some embodiments, the network node 106 comprises one or more processing circuits 420 configured to implement processing of the method 200 of FIG. 2, method 300 of FIG. 3, and certain associated processing of the features described in relation to FIG. 1, such as by implementing functional means or units above. In one embodiment, for example, the processing circuit(s) 420 implements functional means or units as respective circuits. The circuits in this regard may comprise circuits dedicated to performing certain functional processing and/or one or more microprocessors in conjunction with memory 430. In embodiments that employ memory 430, which may comprise one or several types of memory such as read-only memory (ROM), random-access memory, cache memory, flash memory devices, optical storage devices, etc., the memory 430 stores program code that, when executed by the one or more microprocessors, causes the network node to carry out the techniques described herein.

In one or more embodiments, the network node 106 also comprises one or more communication interfaces 410. The one or more communication interfaces 410 include various components (e.g., antennas 440) for sending and receiving data and control signals. More particularly, the interface(s) 410 include a transmitter that is configured to use known signal processing techniques, typically according to one or more standards, and is configured to condition a signal for transmission (e.g., over the air via one or more antennas 440). Similarly, the interface(s) include a receiver that is configured to convert signals received (e.g., via the antenna(s) 440) into digital samples for processing by the one or more processing circuits. In an aspect, the data obtaining means or unit 440 and/or the feedback providing means or unit 480 may comprise or may be in communication with the transmitter and/or receiver. The transmitter and/or receiver may also include one or more antennas 440.

Figure 5:
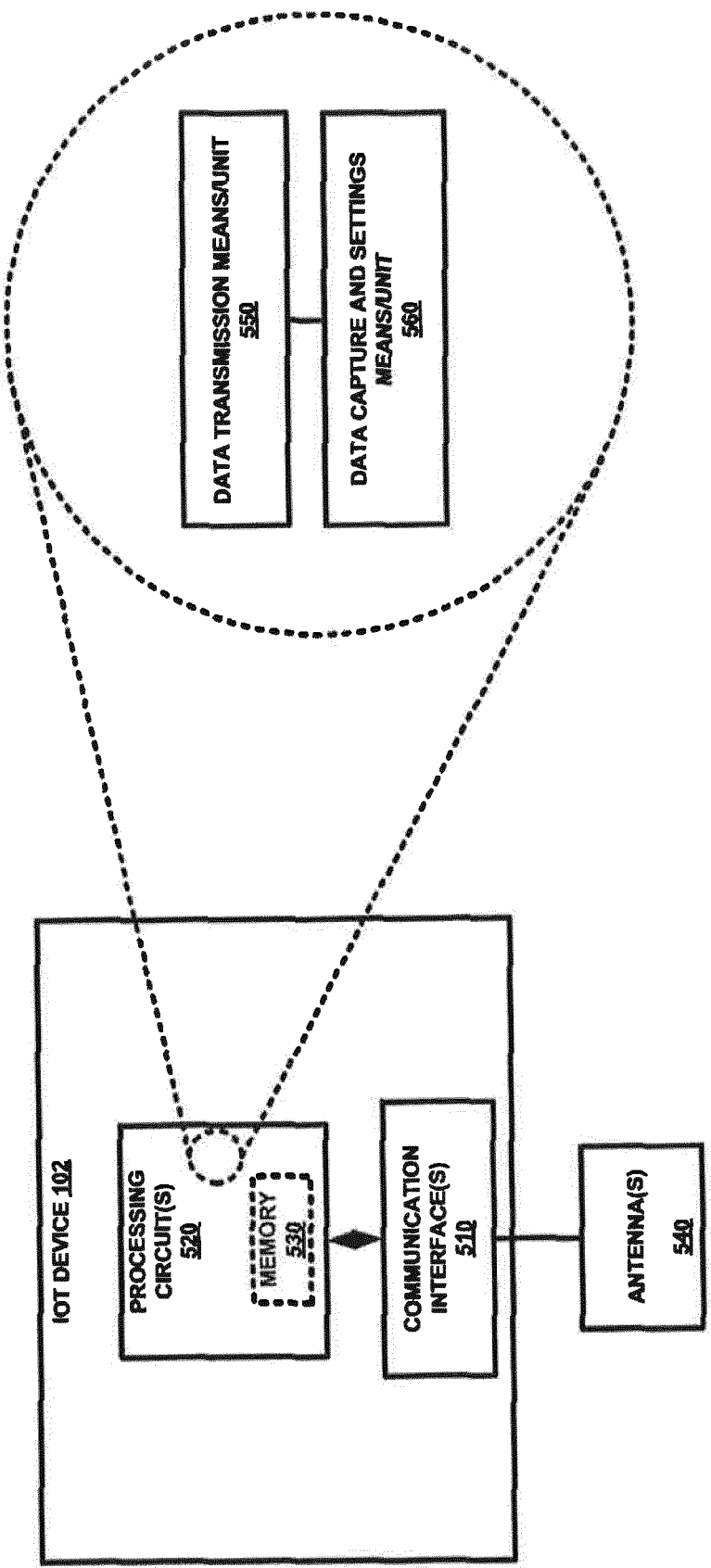
FIG. 5 illustrates aspects of an example IoT device in example embodiments of the present invention.

FIG. 5 illustrates additional details of an example IoT device 102 according to one or more embodiments. The IoT device 102 is configured, e.g., via functional means or units (also may be referred to as modules or components herein), to implement processing to perform certain aspects described above in reference to FIGS. 1-3 herein. The IoT device 102 in some embodiments for example includes a data transmission means or unit 550 for transmitting captured data to a network node 105, and a data capture and setting means or unit for capturing data according to one or more settings, such as updating settings values according to commands received from a network node 105. These and potentially other functional means or units (not shown) together perform the IoT features described in FIGS. 1-3 as being related to the IoT device 102.

In at least some embodiments, the IoT device 102 comprises one or more processing circuits 520 configured to implement processing of the method 200 of FIG. 2 and certain associated processing of the features described in relation to IoT device 102 to FIGS. 1 and 3, such as by implementing functional means or units above. In one embodiment, for example, the processing circuit(s) 520 implements functional means or units as respective circuits. The circuits in this regard may comprise circuits dedicated to performing certain functional processing and/or one or more microprocessors in conjunction with memory 530. In embodiments that employ memory 530, which may comprise one or several types of memory such as read-only memory (ROM), random-access memory, cache memory, flash memory devices, optical storage devices, etc., the memory 530 stores program code that, when executed by the one or more microprocessors, causes the device to carry out the techniques described herein.

In one or more embodiments, the IoT device 102 also comprises one or more communication interfaces 510. The one or more communication interfaces 510 include various components (e.g., antennas 540) for sending and receiving data and control signals. More particularly, the interface(s) 510 include a transmitter that is configured to use known signal processing techniques, typically according to one or more standards, and is configured to condition a signal for transmission (e.g., over the air via one or more antennas 540). In an aspect, the revealing module or unit 550 may comprise or may be in communication with the transmitter. Similarly, the interface(s) include a receiver that is configured to convert signals received (e.g., via the antenna(s) 540) into digital samples for processing by the one or more processing circuits. The transmitter and/or receiver may also include one or more antennas 540.

Those skilled in the art will also appreciate that embodiments herein further include corresponding computer programs. A computer program comprises instructions which, when executed on at least one processor of the network node 106, feedback device 112, or IoT device 102 cause these devices to carry out any of the respective processing described above. Furthermore, the processing or functionality of network node 106 may be considered as being performed by a single instance or device or may be divided across a plurality of instances of network node 106 that may be present in a given cloud network such that together the device instances perform all disclosed functionality. In addition, network node 106 may be any known type of device associated with a cloud network, radio communication network, or content delivery network, generally, that is known to perform a given disclosed processes or functions thereof. Examples of such network nodes include eNBs, Mobility Management Entities (MMEs), gateways, servers, and the like.

Embodiments further include a carrier containing such a computer program. This carrier may comprise one of an electronic signal, optical signal, radio signal, or computer readable storage medium. A computer program in this regard may comprise one or more code modules corresponding to the means or units described above.

A network node 106 herein is any type of network node (e.g., a base station) capable of communicating with another node over radio signals. IoT device 102 is any type device capable of communicating with a radio network node 10 over radio signals, such as, but not limited to, a device capable of performing autonomous wireless communication with one or more other devices, including a machine-to-machine (M2M) device, a machine-type communications (MTC) device, a user equipment (UE) (however it should be noted that the UE does not necessarily have a "user" in the sense of an individual person owning and/or operating the device). An IoT device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without (or with minimal) direct human interaction.

In any scenario discussed above, the IoT device 102 herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In the above examples, the gestures may be recorded with sensors, e.g., IMU (Inertial Measurement Unit) sensor-equipped squash racquets, wristbands, shoes, etc., while the movements of the players and of the squash balls may be recorded by cameras and/or microphones mounted on the squash court walls. Sensor (and audio and video) data may be processed in the cloud, and fed back to the (remote) players on each court by a projector, mounted on, e.g., the ceiling and projecting images and/or video to the (front) wall(s) and/or to the floor. Additionally or alternatively, a possible way of information feedback to players in a squash court could be implemented via haptic devices installed in the squash racquets and/or wrist bands.

The inventive nature of the proposed system stems, at least in part, from the novel multi-purpose usage of cheap sensors mounted on a squash court and on sports equipment. The input and output interfaces may be implemented by the aforementioned cheap gears, which may already be necessary and in place in order to enrich traditional sporting experience. The computations related to the actual games may be performed in the cloud, as opposed to local computation performed in game consoles, and the connectivity of the sport spaces, already in place, may be used to transfer the sensor data up to the cloud, and the user interface and feedback back to the sport spaces.

The proposed system implements a single- or multi-player interactive video game that can be played by players on separate squash courts located in a distance from one another. The gestures of the players may be recorded with sensors, e.g., IMU (Inertial Measurement Unit) sensor-equipped squash racquets, wristbands, shoes, etc., while the movements of the players and of the squash balls may be recorded by cameras and/or microphones mounted on the squash court walls. Sensor (and audio and video) data may be processed in the cloud, and fed back to the (remote) players on each court by a projector, mounted, for example, on the ceiling and projecting images and/or video to the (front) wall(s) and/or to the floor. Additionally or alternatively, a possible way of information feedback to players in a squash court could be implemented via haptic devices installed in the squash racquets and/or wrist bands.

The proposed system is effective partly because it can utilize cheap sensors mounted on a squash court and on sports equipment. The input and output interfaces may be implemented by the aforementioned cheap gears, already necessary and in place in order to enrich traditional sporting experience. The computations related to the actual games may be performed in the cloud, as opposed to local computation performed in game consoles, and the connectivity of the sport spaces, already in place, is used to transfer the sensor data up to the cloud, and the user interface and feedback back to the sport spaces. Some embodiments are presented herein that can be implemented in the proposed system with various level of complexity, i.e., number and diversity of sensors and actuators to be applied for the given use case. With these examples, it is intended to show that the input devices, the collected data streams, the data processing steps and the output devices of the multiplayer game can be different across the players, the smart sports equipment and the smart sport spaces being only a subset of the potential interconnected devices.

One example embodiment relates to playing catch. Many, remotely situated squash courts can be used to play catch among players on all those courts. In order to do this, the necessary set of sensors contains devices that can track the players on each court, and the necessary set of actuators contains devices that can distinguish the catcher and pinpoint the catcher's position on all courts at all times (every player being on a common virtual field). A possible, sufficient set of devices comprises of one ceiling-mounted camera on each court with a view on the whole court surface, a lighting wrist band on each player that signals red on the catcher, and a ceiling-mounted projector that projects a red spot to the respective position of the catcher on all courts.

Another example embodiment relates to playing a brick breaker game between a squash court and a smartphone. The brick breaker game can be played among players that either play in one or more squash courts, or on their smartphones. A sufficient set of devices to support this is the following: a back-wall-mounted camera on each squash court to detect the positions of ball impacts on the front wall, motion sensors in each squash racquet in order to link ball impacts to players by detecting the strokes prior to impacts, a projector on each court to project the brick breaker game on the front wall, and a mobile application client at each player that plays on their smartphone to detect the touches on the screen and to render the brick breaker game on the screen. Note that in this case the physical dimensions of the common brick wall are not the same on every output visualization, i.e., front wall of a squash court vs. screen size of a smartphone.

Figure 6:
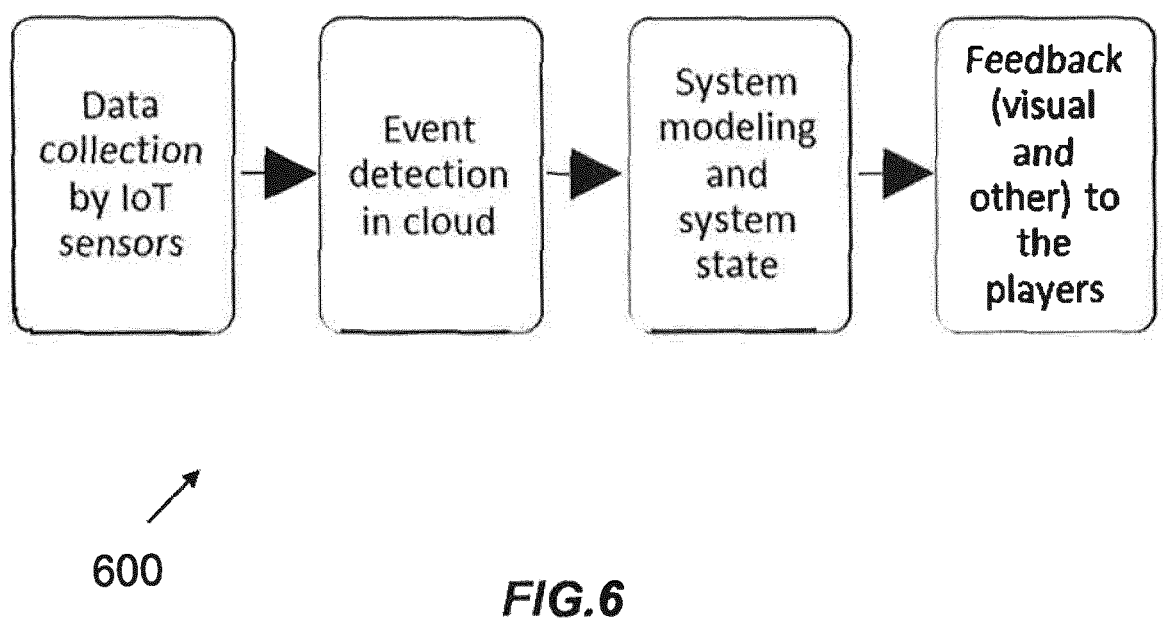
FIG. 6 illustrates an example process chain according to embodiments of the present invention.

FIG. 6 shows an example of the process chain 600 from data gathering to the feedback step that determine video and other information that may have to be fed back to the player(s) at a given time. In the first step, data is collected from the environment by any type of sensors, e.g., cameras, then in the second step the data is uploaded and processed in the cloud by custom-made event detection algorithms, e.g., ball tracking. In the third step the computed parameters are loaded in the predefined data model, and the current model state of the observed system is established. In the fourth step, based on the current state and the data model, feedback is given to the player(s), e.g., the image projected on the wall is updated.

Figure 7:
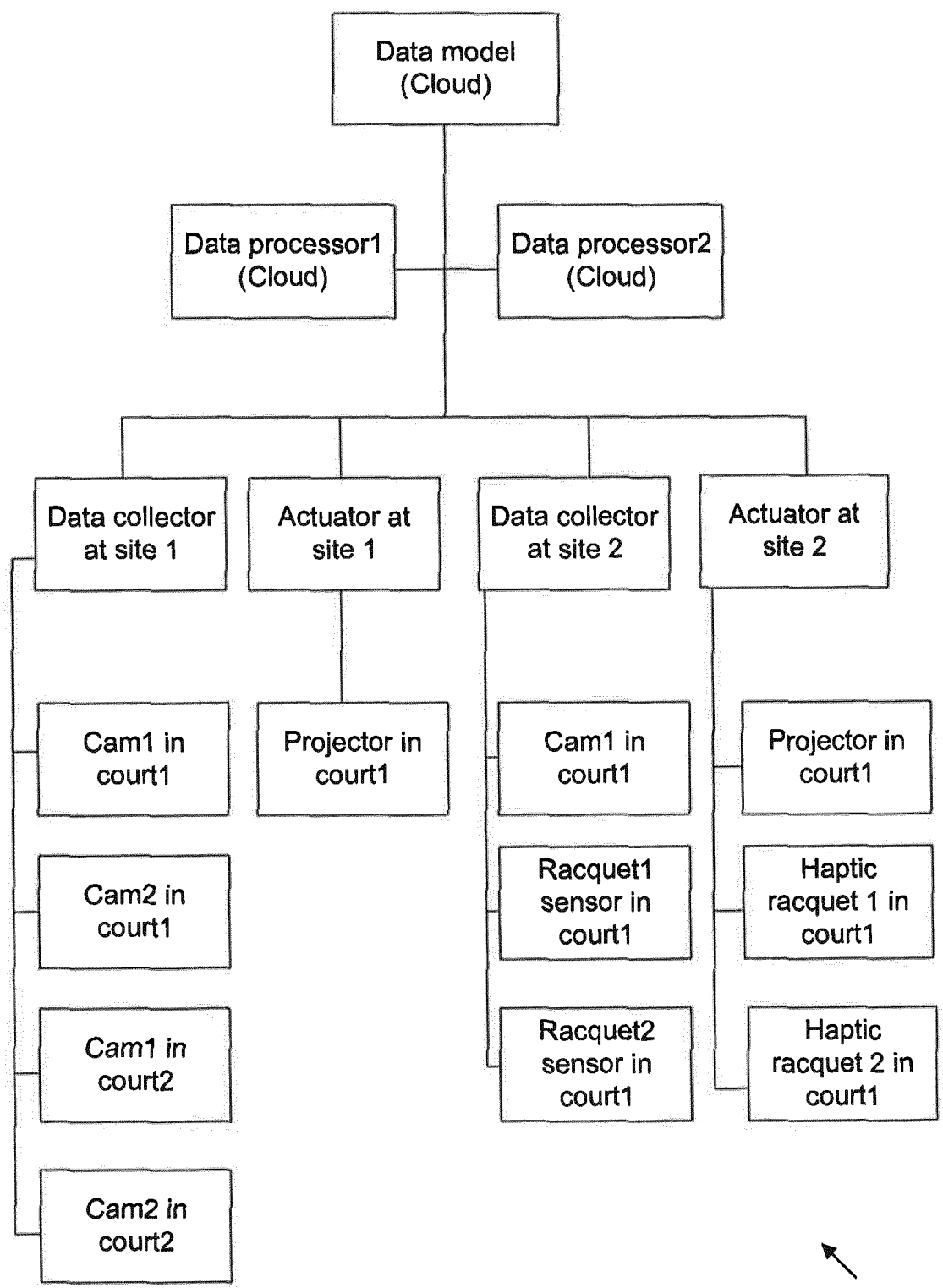
FIG. 7 illustrates an example implementation according to embodiments of the present invention.

FIG. 7 shows the functional blocks of an example of the proposed system 700. In the lowest layer, at the edge of the IoT system, there are sensors (cameras, accelerometers, etc.) and the Data collector modules with uplink capacity that is used for uploading the raw, unprocessed sensor-collected data to the cloud. Within the cloud there are Data processor blocks that are responsible for processing the uploaded data in order to distill information, in most cases events from the data streams. The Data model keeps track of each game session and it is continuously refined be the Data processor module(s). When necessary, the Data model sends feedback to the IoT system, i.e., to the Actuators at the sites so that those can visualize information on the wall, and/or play audio in the courts, and/or give haptic feedback via racquets, etc. to the players. The block diagram above represents 2 sites, 2 and 1 courts in each respectively, geared with 2, 2 and 1 cameras, 1, 0 and 1 projectors, 0, 0 and 2 motion sensors and haptic devices mounted on racquets.

Figure 8:
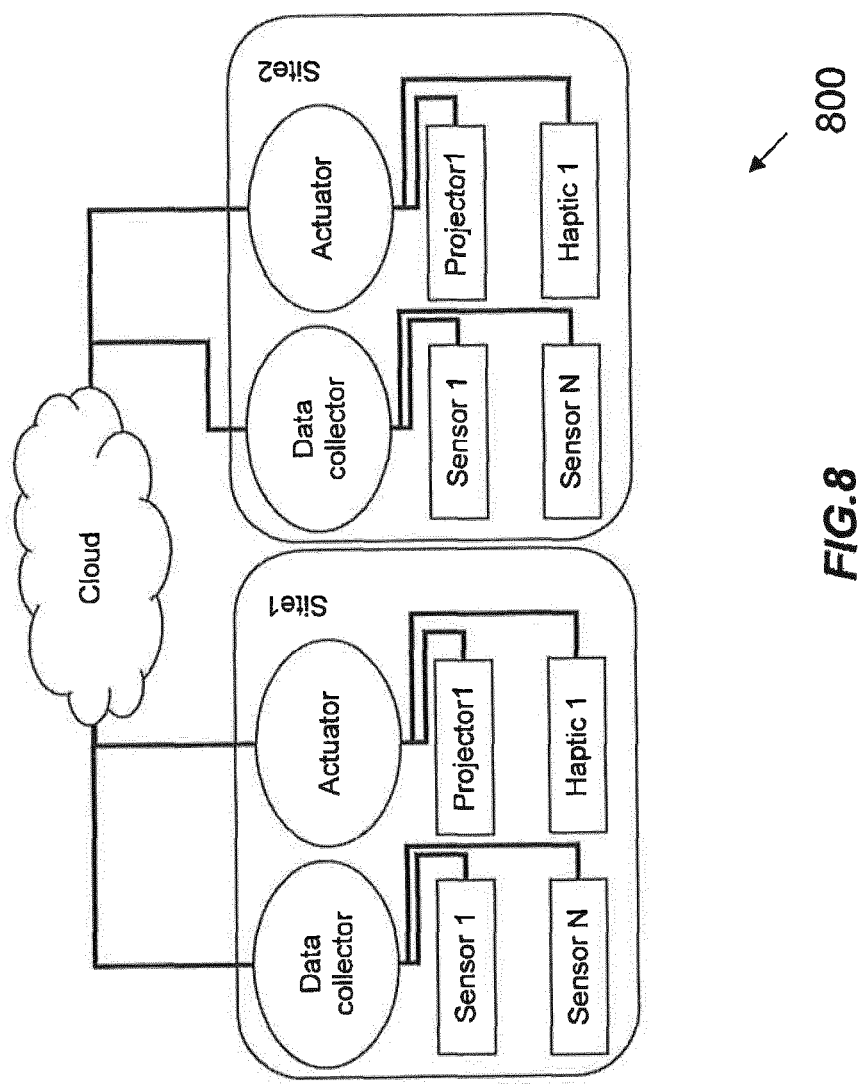
FIG. 8 illustrates communication links between elements according to example embodiments of the present invention.

FIG. 8 shows an example of communication links between the elements of the system 800, comprising two sites in this example. Within the site, the sensors and the various feedback (visual, haptic, etc.) devices are connected to the Data collector and to the Actuator elements respectively, over wireless communication technologies, or possibly over wired communication technologies. These two elements act as gateways towards the cloud over the Internet. Therefore the communication between the Data collector, the Actuator and the Cloud is optionally performed over Internet Protocol (IP), probably via wired links, or possibly via wireless access.

Embodiments outlined herein present a novel and non-obvious combination of sports equipment with video gaming via Internet of Things and Cloud computing technologies. Specifically, for squash, a video game is presented that can be played by two (or more) players that hit the front wall with a squash ball in remote squash courts simultaneously. The multiplayer online games played with sports equipment (either geared with sensors and/or surrounded by tracking sensors mounted on the sport space) can be cooperative and/or competitive. By emulating and/or 3D projecting the only ball players remotely "play with", even regular sport matches can be played by players in a distance from each other.

Advantages of embodiments of the network node of an IoT system and of the method executed by a network node in an IoT system as described herein include one or more of: extending the features of sport spaces, for example, squash courts, with multi-player video gaming, reusing smart sport variable devices for video gaming, substituting home game consoles with cheaper input devices at public sport spaces, and connecting videogame players with sports. The cloud-based solution herein takes significantly more input than existing systems, and can therefore produce fully interactive feedback environments for an activity across disparate activity participation sites.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method executed by a network node in an Internet-of-Things (IoT) system, the method comprising:
   obtaining data captured by one or more IoT devices and associated with an interactive activity with which different participants interface at different sites;
   determining a state of the activity by applying the data to a data model; and
   providing one or more feedback signals to feedback devices associated with one or more of the different sites to actualize the determined state of the activity, at least two of the different sites having disparate feedback device sets;
   wherein the providing the one or more feedback signals comprises actualizing the determined state of the activity by applying different forms of sensory feedback to the different participants via a feedback device set associated with a site of each of the different participants and the different forms of sensory feedback are applied based on the state of the activity shared by each of the different sites.

2. The method of claim 1, wherein the state comprises a state of the activity at a time at which the data is captured by the one or more IoT devices, a state at a current time, a predicted state of the activity at a future time, or a combination thereof.

3. The method of claim 1, wherein the determining the state comprises identifying a location of one or more of the different participants in a common virtual activity space.

4. The method of claim 1, wherein at least two of the different sites have disparate IoT device sets.

5. The method of claim 1, wherein at least one of the participants interfaces with the interactive activity virtually via an input-output device.

6. The method of claim 1, wherein at least one of the participants interfaces with the interactive activity in a feedback-device-rendered variation of a traditional real-life form of the activity.

7. The method of claim 1, wherein the activity comprises a competition between or among a plurality of the different participants or a competition between a single participant against a benchmark or previous score.

8. The method of claim 1, wherein the disparate feedback device sets comprise at least two sets of feedback devices whose included device types are non-identical.

9. The method of claim 1, wherein the network node comprises a plurality of network devices working in collaboration.

10. The method of claim 1, wherein the IoT system comprises a cloud computing system.

11. A network node in an Internet-of-Things (IoT) system, the network node comprising:
   processing circuitry;
   memory containing instructions executable by the processing circuitry whereby the network node is operative to:
      obtain data captured by one or more IoT devices and associated with an interactive activity with which different participants interface at different sites;
      determine a state of the activity by applying the data to a data model; and
      provide one or more feedback signals to feedback devices associated with one or more of the different sites to actualize the determined state of the activity, at least two of the different sites having disparate feedback device sets;
   wherein the providing the one or more feedback signals comprises actualizing the determined state of the activity by applying different forms of sensory feedback to the different participants via a feedback device set associated with a site of each of the different participants and the different forms of sensory feedback are applied based on the state of the activity shared by each of the different sites.

12. A non-transitory computer readable recording medium storing a computer program product for controlling a network node in an Internet-of-Things (IoT) system, the computer program product comprising software instructions which, when run on processing circuitry of the network node, causes the network node to:
   obtain data captured by one or more IoT devices and associated with an interactive activity with which different participants interface at different sites;
   determine a state of the activity by applying the data to a data model; and
   provide one or more feedback signals to feedback devices associated with one or more of the different sites to actualize the determined state of the activity, at least two of the different sites having disparate feedback device sets;
   wherein providing the one or more feedback signals comprises actualizing the determined state of the activity by applying different forms of sensory feedback to the different participants via a feedback device set associated with a site of each of the different participants and the different forms of sensory feedback are applied based on the state of the activity shared by each of the different sites.

* * * * *